US009744713B2

(12) United States Patent
Hinterseer et al.

(10) Patent No.: US 9,744,713 B2
(45) Date of Patent: Aug. 29, 2017

(54) THERMOFORMING PLANT, TRANSPORT SYSTEM AND THERMOFORMED PRODUCT PRODUCED THEREWITH

(75) Inventors: Heinz Hinterseer, Freilassing (DE); Martin Weibhauser, Schoenram (DE); Peter Knoll, Ainring (DE)

(73) Assignee: KIEFEL GmbH, Freilassing (DE)

( * ) Notice: Subject to any disclaimer, the term of this patent is extended or adjusted under 35 U.S.C. 154(b) by 457 days.

(21) Appl. No.: 13/702,420

(22) PCT Filed: Apr. 11, 2011

(86) PCT No.: PCT/DE2011/000380
§ 371 (c)(1),
(2), (4) Date: Jan. 14, 2013

(87) PCT Pub. No.: WO2011/153976
PCT Pub. Date: Dec. 15, 2011

(65) Prior Publication Data
US 2013/0108836 A1 May 2, 2013

(30) Foreign Application Priority Data

Jun. 7, 2010 (DE) .................. 10 2010 022 859
Mar. 2, 2011 (DE) .................. 10 2011 012 882

(51) Int. Cl.
*B29C 51/26* (2006.01)
*B65G 17/00* (2006.01)
*B29C 55/02* (2006.01)
*B29C 51/24* (2006.01)
*B29C 51/20* (2006.01)
(Continued)

(52) U.S. Cl.
CPC ............ *B29C 51/261* (2013.01); *B65G 17/00* (2013.01); *B29C 51/18* (2013.01); *B29C 51/20* (2013.01); *B29C 51/24* (2013.01); *B29C 51/262* (2013.01); *B29C 51/423* (2013.01); *B29C 55/02* (2013.01); *B29C 55/04* (2013.01); *B29C 55/08* (2013.01);
(Continued)

(58) Field of Classification Search
CPC ......... B29C 51/18; B29C 51/20; B29C 51/24; B29C 51/261; B29C 51/262; B29C 51/423; B29C 55/02; B29C 55/04; B29C 55/08; B65G 17/00; B65G 21/22; Y10T 428/24628
USPC ......... 425/324.1, 325, 394, 397, 408; 26/51, 26/52, 96
See application file for complete search history.

(56) References Cited

U.S. PATENT DOCUMENTS 3,321,561 A 5/1967 Brown
3,611,481 A 10/1971 Malosh et al.
(Continued)

FOREIGN PATENT DOCUMENTS

DE 23 35 246 1/1975
JP H10-305480 A 11/1998

OTHER PUBLICATIONS

International Search Report of PCT/DE2011/000380, Apr. 18, 2012.
German Search Report in 10 2011 012 882.4, dated Aug. 26, 2014, with an English translation of relevant parts.

*Primary Examiner* — Seyed Masoud Malekzadeh
(74) *Attorney, Agent, or Firm* — Collard & Roe, P.C.

(57) ABSTRACT

The invention relates to thermoforming plant and their transport chains. Various aspects of the chain and chain rails are proposed. Overall the chain operates such that less wear occurs; it can also be cooled symmetrically and the film can be better heated up to the edges.

8 Claims, 5 Drawing Sheets

(51) Int. Cl.
    *B29C 51/18*     (2006.01)
    *B29C 55/04*     (2006.01)
    *B29C 51/42*     (2006.01)
    *B29C 55/08*     (2006.01)
    *B65G 21/22*     (2006.01)

(52) U.S. Cl.
    CPC ....... *B65G 21/22* (2013.01); *Y10T 428/24628* (2015.01)

(56) References Cited

U.S. PATENT DOCUMENTS

| | | | | |
|---|---|---|---|---|
| 3,726,389 | A * | 4/1973 | Klein | B29C 51/261 198/803.7 |
| 3,828,997 | A * | 8/1974 | Snow | B65H 20/16 226/172 |
| 4,022,091 | A * | 5/1977 | Frigo | B29C 51/261 83/175 |
| 4,101,252 | A * | 7/1978 | Brown | B29C 51/261 425/384 |
| 4,196,164 | A * | 4/1980 | Ward | B65H 20/20 264/280 |
| 4,308,005 | A * | 12/1981 | Zundel | B29C 51/445 425/302.1 |
| 4,428,723 | A | 1/1984 | Thiel et al. | |
| 4,459,093 | A * | 7/1984 | Asano | B26D 5/26 264/148 |
| 4,954,066 | A | 9/1990 | Leary et al. | |
| 5,086,729 | A * | 2/1992 | Katagiri | B29C 51/261 118/50 |

* cited by examiner

THERMOFORMING PLANT, TRANSPORT SYSTEM AND THERMOFORMED PRODUCT PRODUCED THEREWITH

CROSS REFERENCE TO RELATED APPLICATIONS

This application is the National Stage of PCT/DE2011/000380 filed on Apr. 11, 2011, which claims priority under 35 U.S.C. §119 of German Application No. 10 2010 022 859.1 filed on Jun. 7, 2010 and German Application No. 10 2011 012 882.4 filed on Mar. 2, 2011, the disclosures of which are incorporated by reference. The international application under PCT article 21(2) was not published in English.

The invention relates to a thermoforming line, a transport system with a chain for use in a thermoforming line, as well as a thermoformed product manufactured herewith.

A variety of thermoforming lines are known in the art. Such a line consists of several stations. A transport system with a chain grips a plastic layer to be processed at the entry to the line. Often involved here is an endless film or endless film tube that is pulled from a roller. The transport system conveys the plastic layer to be processed through the line stations, which are usually linearly and serially arranged. In the process, the plastic layer is heated, and enters the actual thermoforming station in a heated state. It is there formed, punched out or otherwise separated, as desired, and delivered to the line exit.

Since the plastic layer is subjected to thermal fluctuations, its strength and dimensions change. The holders for the plastic layer, most often a chain with pins or clips, usually try and keep the material web taut transversely under a slight prestress, i.e., in a direction essentially perpendicular to the machine direction and within the plane of the plastic layer.

The transverse forces that here act on the transport system detract from the service life of the transport system. For this reason, support rollers are usually provided for absorbing the transverse force in addition to the actual chain. The support rollers must not be situated on each chain link. Most of the time, they are only encountered here and there at regular intervals on a revolving transport chain.

The object of the invention is to provide an improved transport system, and hence an improved thermoforming line.

In one aspect of the invention, the object is achieved by means of a thermoforming line for forming a plastic layer, with a chain for transporting the plastic layer through the thermoforming line, wherein the chain comprises a holding means for the plastic layer, so that the plastic layer can exert a transverse force on the chain via the holding means transverse to the direction of chain progression with the thermoforming line in operation, and with a guide for the chain to absorb the transverse force, wherein the chain comprises a basic structure with a plurality of rollers between brackets to absorb a force in the transport direction, wherein rollers are oriented upright, so that the transverse force acts transverse to their roller axes.

Let the following be noted with respect to terminology:

The "thermoforming line" is an exemplary plastic processing line. The invention introduced here must not be construed as being limited to one thermoforming line.

The "plastic line" can in particular consist of a film web, a film tube web, or individual plastic plates.

The "chain" is normally designed with a conventional basic structure, i.e., with articulated links. Situated between outer brackets and inner brackets are bolts, which are fitted with sleeves that in turn carry rollers.

The "holders" in thermoforming lines are usually pins or clips. The plastic layer is either pinned or clipped into the latter.

During operation of the thermoforming line, the plastic layer can exert "transverse forces" on the chain. For example, this happens when the plastic film is thermally narrowed, when two chain rails for tautening the plastic layer spread apart, or even already owing to the gravitational force of the plastic layer. In particular, a transverse force is to be understood as a precisely horizontal force exerted at precisely a right angle to the machine direction. However, small deviations are encompassed by the term transverse force; the two chain rails at the right and left edge of the plastic layer are often divergently arranged for spreading the plastic layer; the direction of chain progression then deviates by a few degrees from a parallelism relative to the machine direction. The plastic layer also does not behave in precisely a homogenous manner at times, so that inhomogeneous forces may arise. Finally, just a slight sagging of the film already causes the transverse force to not actually act horizontally on the two laterally arranged chain rails, which are most often situated at precisely the same height, but rather at a slight downward angle. Therefore, the transverse force must be understood as at least essentially, i.e., subject to a deviation of 20°, or better of under 10°, laterally standing perpendicularly to the machine direction and chain progression direction, and as engaging essentially horizontally, i.e., with a deviation from the horizontal measuring less than 20° or 10°.

As a rule, a chain rail pair is present in the line at each location along the transport path.

The "guide" is available for the chain on the line or transport system side. It prevents the chain from excessively deviating in a lateral direction when exposed to the transverse force. The guide usually takes the form of a chain rail.

According to the first aspect of the invention, rollers are to be oriented "upright", wherein a precise vertical alignment only represents a special manifestation of the invention with respect to this alignment. An upright orientation of the roller must also be construed as encompassing a direction deviating from the precise vertical direction, primarily as a less than a 20° or 10° deviation relative to the vertical.

Not all rollers must be situated upright. Rather, it is also conceivable for the chain be laid flat on its path, and then later be propped up again when desired. However, it is probably the simplest for all rollers to be oriented upright, with all primarily being practically vertical.

The proposed roller orientation does cause the transverse force to act on the chain. However, this chain can roll away this transverse force. In particular, the chain links do not become jammed, with the force that acts essentially perpendicular to the roller axis only allowing the chain links to pivot relative to each other by the provided swivel axis.

This protects the chain, and leads to a more reliable line.

In a second aspect of the invention, the set object is achieved by means of a thermoforming line for processing a plastic layer, with a chain for transporting the plastic layer through the thermoforming line, wherein the chain comprises a holding means for the plastic layer, so that the plastic layer can exert a transverse force on the chain via the holding means transverse to the direction of chain progression with the thermoforming line in operation, and with a guide for the chain to absorb the transverse force, wherein the chain comprises a basic structure with a plurality of rollers between brackets to absorb a force in the transport direction, and wherein the guide acts directly on rollers.

In this aspect of the invention, the guide is to act directly on the rollers to absorb the transverse force. As a result, the chain can be given a simple structural design, thereby making it more cost-effective.

The chain is preferably free of transverse force support rollers. Previously known chains had these transverse force support rollers, which abutted against a strip remote from the rollers in order to absorb the transverse force. There was a division of tasks in such chains: The chain drive engaged the basic structure of the chain, i.e., the rollers present there. By contrast, the transverse force support rollers were provided to absorb the transverse forces from the plastic web.

The second aspect of the invention proposed here combines both the propulsion and transverse force resistance on the rollers of the basic structure. The transverse force support rollers can thus be eliminated.

The chain can be vertically propped on a sliding surface with its outer brackets or sliders secured thereto. In this type of structural design, additional measures need not be provided for absorbing the weight of the chain or force components acting vertically on the chain.

It would be somewhat more expensive, but normally more precise, if the chains were to be vertically propped on gravitational force support rollers. The rollers forming the chain themselves are different from the gravity support rollers that only support the chain in a perpendicular direction.

In a preferred embodiment of the chain, rollers comprise a contour that is vertically self-centering relative to the guide when exposed to a transverse force, wherein the guide provides a lateral complementary contour.

Independently of the above, rollers can comprise a contour that is horizontally self-centering relative to the guide when exposed to a gravitational force, wherein the guide provides a lower complementary contour.

Let these two aspects bring to mind in particular spherical, frustro-spherical or otherwise convex or concave contours.

For example, it can be readily imagined that the roller sitting on the chain sleeve is not smoothly cylindrical, but rather comprises a crown bow. Polygonal cross sections are also easily conceivable for the roller, for example an inclined square or hexagonal contour.

The guide, i.e., in particular a chain rail, can provide an independently lateral or lower, preferably lateral and lower, complementary shape for the self-centering roller contour. For example, given a spherical outer contour of the chain rollers, it can be imagined that the chain rail profile furnishes a spherical, concave shell all around the rollers inside the brackets. During a deflection caused by a transverse force, the spherical surface of the individual roller oriented toward the plastic layer then runs into the concave shell of the chain rail situated laterally adjacent to it, thereby vertically centering the roller, specifically at the average height of its own spherical structure, and simultaneously at the average height of the lateral, shell-shaped receptacle.

Aside from a longitudinally directed tensile force in the chain, a pure gravitational force acting on the chain causes the spherical shape to fall into the shell-shaped concavity of the chain rail, as it were, and become centered horizontally, center to center.

In a third aspect of the invention, the set object is achieved by means of a thermoforming line for processing a plastic layer, with a chain for transporting the plastic layer through the thermoforming line, wherein the chain comprises a holding means for the plastic layer, so that the plastic layer can exert a transverse force on the chain via the holding means transverse to the direction of chain progression with the thermoforming line in operation, and with a guide for the chain to absorb the transverse force, wherein the chain revolves in a chain rail profile and comprises a basic structure with a plurality of rollers between brackets to absorb a force in the transport direction, wherein the chain rail profile comprises a mirror symmetrical cross section with an uprightly oriented symmetry axis.

By way of terminological explanation, let reference be made to the above explanations for most of the features involving this aspect of the invention.

The chain revolves in a chain rail. In a preferred embodiment, this means that the chain revolves in the same chain rail profile on its way out and back. However, it is also possible for the chain to run in only one direction in a profile, and follow a separate profile or run freely on its way back. This feature is implemented when either one of the then several chain rail profiles is mirror symmetrical with an upright symmetry axis or the then several chain rails on one side of the plastic layer together satisfy this feature.

A mirror symmetry with upright symmetry axis preferably results overall for the chain arranged in the chain rail profile.

Understood by an "uprightly" oriented symmetry axis in particular is a vertically standing symmetry axis that is upright, preferably everywhere, over the progression of the chain rail profile, which is generally linear, i.e., yields a symmetry plane. No precisely vertical alignment is necessary. Let it first be noted that an engineering-related deviation from the vertical is as a result still quasi-vertical for the chain rail. In addition, the feature can easily be realized with an exemplary angular deviation of at most 10 or 20° relative to the vertical.

A symmetrical chain rail profile, in particular given a mirror symmetry with the inclusion of the revolving chain, preferably comprises a cooling channel in the symmetry axis. A cooling fluid pumped through the latter can then cool the profile and chain in a symmetrical manner. This increases processing precision.

Of course, several cooling channels can be arranged in the symmetry axis. It also goes without saying that cooling channels can be provided in the profile in addition to the symmetry axis.

In a fourth aspect of the invention, the set object is achieved by means of a thermoforming line for processing a plastic layer, with a chain for transporting the plastic layer through the thermoforming line, wherein the chain comprises a holding means for the plastic layer, so that the plastic layer can exert a transverse force on the chain via the holding means transverse to the direction of chain progression with the thermoforming line in operation, and with a guide for the chain to absorb the transverse force, wherein the chain runs in a chain rail profile and comprises a basic structure with a plurality of rollers between brackets to absorb a force in the transport direction, wherein a heater is provided to heat up the plastic layer, and wherein the side of the chain rail profile toward the holder comprises a chamfer.

The "heater" is most often a flat heater. In thermoforming lines, such heaters can be located both above and below the transport path for the plastic web. However that may be, the heater is most often situated above the plastic layer. The latter extends downward, so that the plastic layer conveyed via the transport chains is heated in front of the forming station, and thereby softened.

In order to maximize the amount of plastic transported at a prescribed line width, the holders for the plastic layer are situated as close as possible to the actual basic structure of the chain. Short, curved pins very often emanate from the chain links. The latter protrude laterally from the longitudinal chain direction. The plastic layer is there pinned onto the sides.

In conventional chain rail profiles, an edge region of the plastic layer is thus not encompassed by the heater. Rather, the chain rail profile is an obstacle to direct access by the rays of heat. In addition, there is a danger that the chain rail profile will become too hot, and possibly deform if the radiant heaters excessively encompass the chain rail profile.

In a horizontally arranged plastic layer, the chain rail profile has a side oriented toward the held plastic layer, a lower side, an upper side, and an averted side. In the aspect of the invention introduced here, the side facing the plastic layer is here to comprise the chamfer, meaning jump back as it progresses upward, i.e., continually distance itself from a vertical above the holder. In a simple embodiment, the side facing the plastic layer is completely chamfered.

The chamfer preferably continues until into the upper side of the chain rail profile. For example, it is then conceivable that the chain rail profile comprise an essentially triangular shape, wherein a tip of the triangle is arranged on the upper side given a symmetrical design, so that the upper side runs downward at an inclination from this edge up to the holder.

The above aspects and advantageous features of the invention are also advantageous in any aggregation desired.

Another direct advantage is a transport system with a chain for use in a thermoforming line as described above.

The advantages to such a thermoforming line and/or such a transport system extend directly to a thermoformed product manufactured herewith.

Let it be expressly noted that "at least" expressions were avoided where possible in the interest of better readability. Rather, an indeterminate article ("one", "two", etc.) is normally to be understood as "at least one, two, etc.", unless the context makes it obvious that "precisely" the specified number is meant there.

BRIEF DESCRIPTION OF THE DRAWINGS

The invention will be explained in greater detail below based on exemplary embodiments, with reference to the drawing. Shown therein are.

Figure 1:
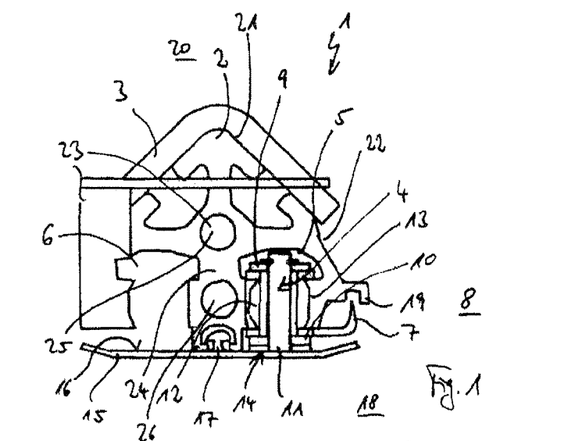
FIG. 1 a schematic cross section of a chain rail profile with a flow space, a return space, and a spiked chain arranged therein.

A transport device 1 on FIG. 1 essentially consists of a chain rail profile 2, a strip 3 lying thereupon, as well as a chain 4, which runs forward in a flow space 5 and back in a return space 6 (chain 4 not depicted there).

The transport device 1 is located in a thermoforming line. Thermoforming products being intermittently transported are there molded out of an endless film web and isolated with a stamping tool.

The thermoforming line incorporates at least one other transport device, which is designed exactly like transport device 1, but mirror inverted. Pins 7 of the chain 4 in the depicted transport device 1 as well as opposing pins of the transport device there thus engage each other, so that the endless film web can be transported in a transport space 8, since the chain 4 is driven or both chains are driven.

The chain 4 has a conventional structural design. Situated between the outer brackets 9 (denoted by example) and inner brackets 10 (denoted by example) are bolts 11 with sleeves (not shown), each with one respective roller 12. The flow space 5 comprises a rail-shaped counter-contour 13 that matches the contour of the roller 12 on the side of the roller 12 directed toward the transport space 8.

The bolt 11 does not sit vertically centered in the brackets, but is rather upwardly slightly offset, thereby yielding a smooth face 14 toward the bottom. Situated there is a tab 15 with a sliding surface 16. The tab 15 is secured to a lower side 18 of the chain rail profile 2 in a receiving area by means of detents 17 spaced uniformly apart.

Located toward the transport space 8 to the side of the counter-contour 13 at roughly the same height is a locking groove 19, in which tips of the pins 7 run.

The rounded strip 3 bent at a right angle lies on the upper side 20 of the chain rail profile 2 on the entire chain rail profile 2. A bearing surface 21 on the chain rail profile 2 for the strip 3 is highly chamfered, specifically at an angle of roughly 45° relative to the horizontal. One side 22 of the chain rail profile 2 also continues at an inclination from its end, so that the locking groove 19 of the chain rail profile 2 is clearly the part of the transport device 1 that together with the pins projects the farthest toward the transport space 8.

Two cooling channels 25, 26 are located at an intersecting point 23 of the essentially cross-shaped chain rail profile 2, as well as in a vertical web under it.

During the operation of the thermoforming line, the chain 4 runs through the flow space 5 with the endless film web pinned in. A turning area is located at the end of the transport device. From there, the chain 4 runs back via the return space 6 to a second turning area, and from there back into the flow space 5.

Because the endless film web in the transport space 8 is made taut in a horizontal direction, the endless film web exerts a transverse force on the chain 4 via the pins 7.

The special arrangement of the chain 4 allows it to transmit forces that result from processing and arise in the endless film web during a temperature change, along with the resultant tensile and pressure load force, in such a way that the running surface between the roller 12 and chain rail profile 2 is uniformly exposed to the lowest specific pressure over a large surface. This keeps it as free of wear as possible.

This makes it possible to avoid the previously known transport chains in a vertically revolving chain rail profile. The latter had support rollers on one side, so as to absorb the gravitational forces caused by tautening the film, and pins for holding the film on the other side of the chain. For geometric and production-related reasons, difficulties were always encountered with regard to wear. Due to the tilting moment induced by transverse forces, the support or transport rollers did not always completely abut against the profile wall over the entire surface.

In the embodiment present here, the chain rail profile is in principle turned, specifically by 90°, and the chain then revolves horizontally. This yields a more favorable progression of forces on the support and draw roller. There is no rolling load. The chain does not become twisted.

In addition, the chain 4 is self-centering from a vertical standpoint: The transverse force toward the transport space draws the octagonal outer contour of the roller 12 into the counter contour 13. The outer contour of the roller 12 is convex, while the inner contour of the counter contour 13 is concave on the profile rail. This ensures that the roller 13 will remove the load placed on the chain rail profile 2.

In addition, the sliding surface 16 is provided on the floor tab 15. In the vertical axis on the sliding elements, the chain 4 hence glides on the sliding surface 16 under its own weight. This can be observed in particular on its way back in the return space 6, since no transverse force is there exerted on the chain that might be able to vertically center the chain.

As a result of the chain rail profile 2 inclined on the surface 20 and side 22, the pinned in film can be heated practically up to its edge by means of heaters in an area of heaters 27.

Figure 2:
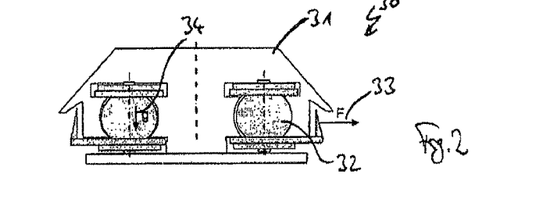
FIG. 2 a simplified schematic cross section of a second exemplary embodiment of a chain rail with a second exemplary embodiment of a chain.

In the second embodiment of a transport device 30 on FIG. 2, a chain rail profile 31 and a chain roller 32 are adjusted to each other in a self-centering way from both a horizontal and vertical standpoint, so that both a gravitational force 33 and a gravitational force 34 each result in self centering, specifically the transverse force 33 from a vertical standpoint and the gravitational force 34 from a horizontal standpoint.

Figure 3:
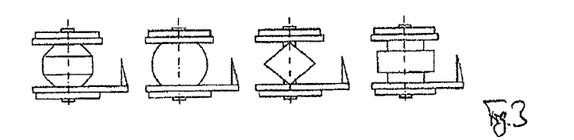
FIG. 3 a schematic side view selected from FIG. 2 of four roller bodies with self-centering characteristics for a chain.

Various additional embodiments for self-centering rollers are depicted on FIG. 3.

In other words:

The invention relates to a transport system that has been improved for processing in a precisely adjusted rhythm in terms of moving the film web available to the roller or plate mold toward the plastic processing machine as needed, reliably further transporting it through or along varied processing steps until the final processing of the material web, and depositing or stacking the end product.

Conventional methods and lines are not well adapted to the requirements of modern plastics and their processing technologies. They are subject to a high level of wear. This leads to cost-intensive handling, a premature replacement of components, and in part poor final results for the end product.

The object of the newly introduced method with the newly introduced device is to guide a plastic film web. A profiled, pressure, temperature and corrosion-resistant guiding rail pair 42 designed specifically for this purpose is used to do just that. The latter operates in parallel, and is able to receive a roller chain pair 43. The roller chain pair is fitted with a number of attachment elements 46, for example in the form of hooks or pins.

The guiding rail pair 42 guides the roller chain pair 43, which is supported on three sides, and rolls without friction. The guiding rail pair 42 is provided with channels 44 through which cooling fluid is passed in order to dissipate arising waste heat.

Rollers 45 of the roller chain pair 43 operate while standing. In the event of a possible dry running of the sliding surface between the rollers 45 and axis in the form of a bolt, the latter are provided with axial perforations in a sleeve, which enables lubricant to pass in a vertical direction, and exit by way of a lateral opening 50.

The load from the roller chain pair 43 is transmitted via a connecting element 51 to a bolt chain 46 located in the lower region of the system. The bolt chain 46 is used as a supporting and running element. It is provided with enlarged roller surfaces. Its load is ultimately also removed by the guiding rail pair 42.

The axial perforation 49 and lateral opening 50 can be provided by simply replacing a solid bolt with a tubular bolt. The central channel is preferably filled with felt. This allows enough lubricating liquid to exit through the horizontal lubricating channels.

Figure 4:
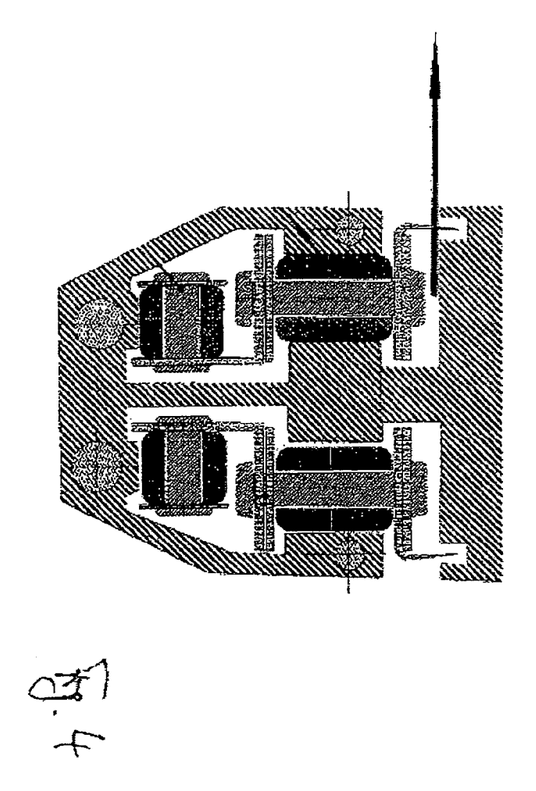
FIG. 4 a schematic cross section of a chain rail profile with draw rollers having a doubled bearing length and support rollers for weight unloading on roughly each fifth to tenth link.
Figure 5:
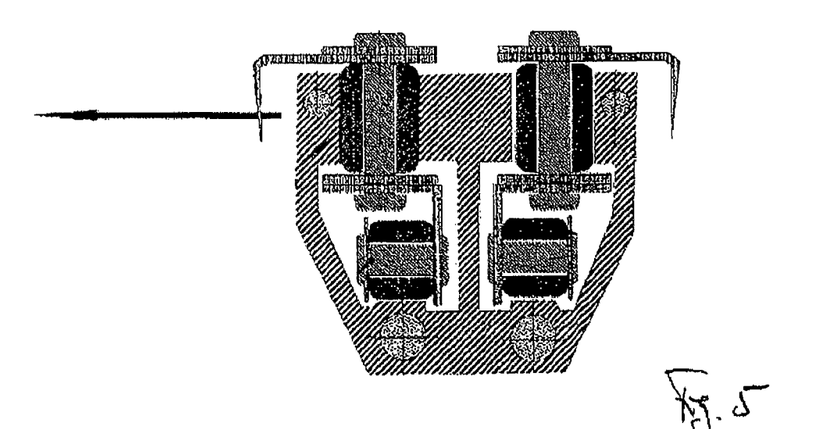
FIG. 5 a schematic cross section analogous to FIG. 4 of a modified embodiment.

Depending on the application, the transport system can be configured in such a way that the film web is gripped from below (see in particular FIGS. 4, 6 and 7) or above (see in particular FIGS. 5, 8 and 9), i.e., punctured by the pins. The chains are driven from the top, and depending on the system can optionally be designed with a horizontal engaging pinion 53 having a vertical axis, or preferably from below with a vertical pinion given a standing axis 53.

The embodiments on FIGS. 5, 6, 7, 8 and 9 provide that the transverse force from the film plane act roughly centrally on the rollers of the upright chain links, which can lengthen the service life of the transport system yet again.

Figure 6:
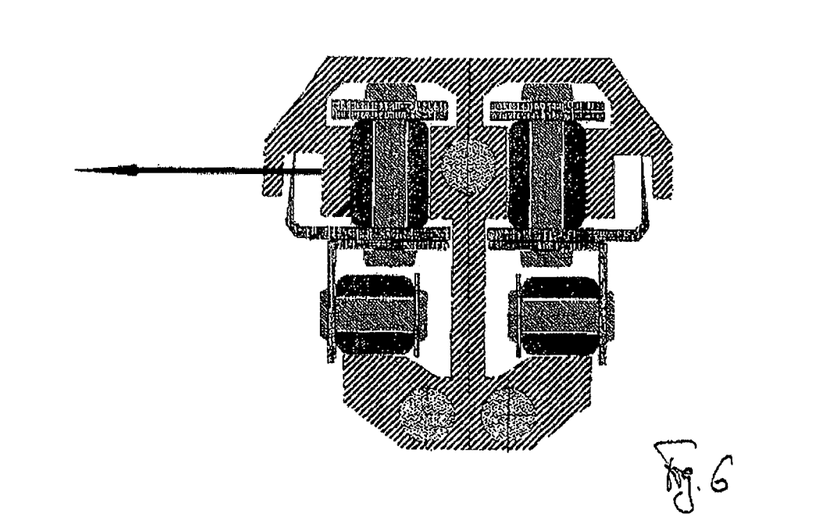
FIG. 6 a schematic cross section analogous to FIGS. 4 and 5 of a further modified embodiment with force acting on the middle or the roller.
Figure 7:
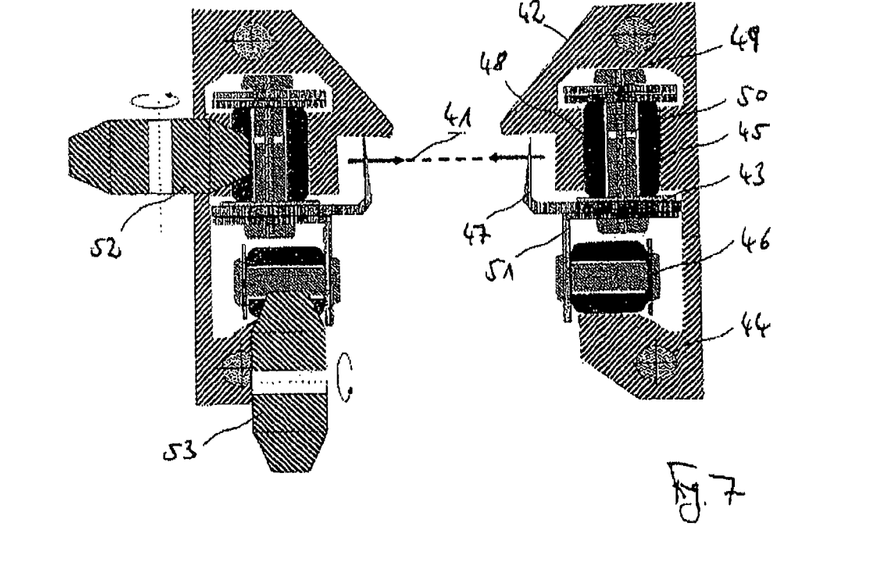
FIG. 7 a schematic cross section with shortened film plane of a chain rail pair with two drive units.
Figure 8:
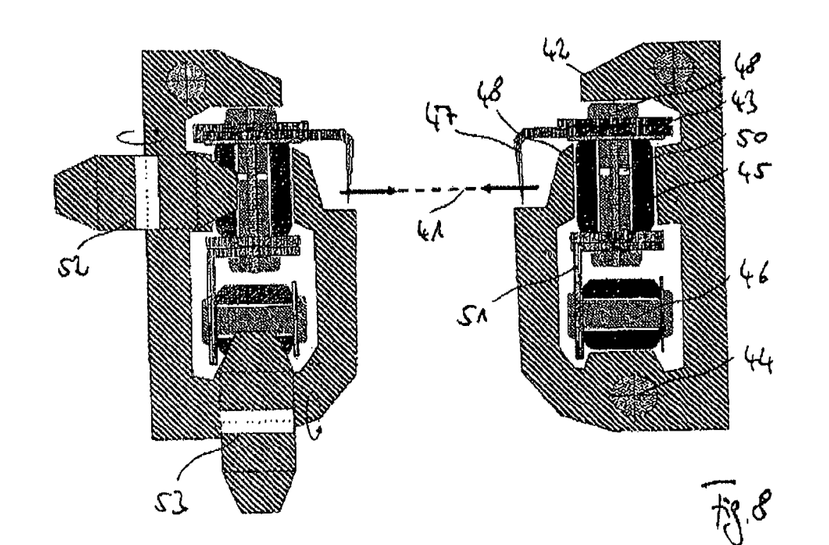
FIG. 8 a schematic cross section analogous to FIG. 7 of a chain rail pair having a modified structural design, and FIG. 9 a schematic cross section analogous to FIG. 7 and of a chain rail pair having the same structural design, with a drive unit.
Figure 9:
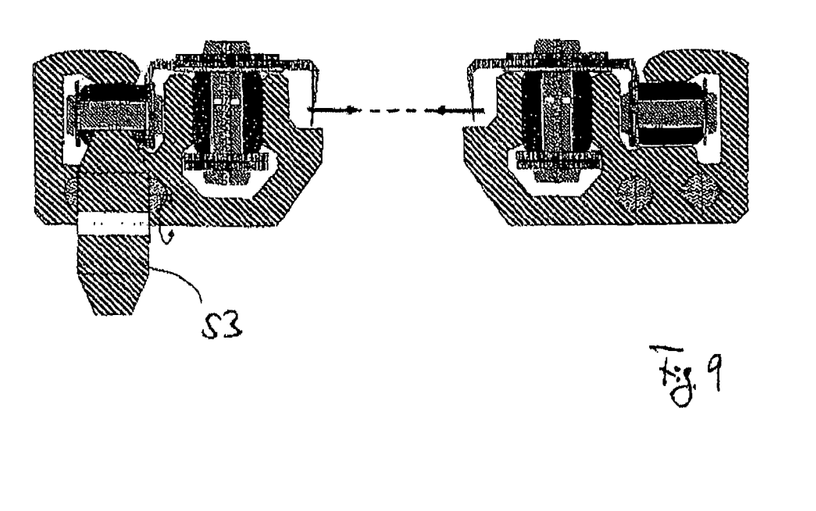

The same holds true for the force transmission point placed between the towing chain links and support rollers on FIGS. 6, 7 and 9.

| Reference List: | |
|---|---|
| 1 | Transport device |
| 2 | Chain rail profile |
| 3 | Strip |
| 4 | Chain |
| 5 | Flow space |
| 6 | Return space |
| 7 | Pins |
| 8 | Transport space |
| 9 | Outer bracket |
| 10 | Inner bracket |
| 11 | Bolt |
| 12 | Roller |
| 13 | Lying contour |
| 14 | Face |
| 15 | Tab |
| 16 | Sliding surface |
| 17 | Detents |
| 18 | Lower side |
| 19 | Locking groove |
| 20 | Upper side |
| 21 | Bearing surface |
| 22 | Side |
| 23 | Intersecting point |
| 24 | Bar |
| 25 | Cooling channel |
| 26 | Cooling channel |
| 27 | Heating space |
| 30 | Transport device |
| 31 | Chain rail profile |
| 32 | Chain roller |
| 33 | Transverse force |
| 34 | Gravitational force |
| 41 | Chain rail film web |
| 42 | Guiding rail pair |
| 43 | Roller chain pair |
| 44 | Channel |
| 45 | Roller |
| 46 | Bolt chain |
| 47 | Attachment element |
| 48 | Counter-contour |
| 49 | Axial perforation |
| 50 | Lateral openings |
| 51 | Connecting element |

-continued

Reference List:

| | |
|---|---|
| 52 | Engaging pinion |
| 53 | Axis |

The invention claimed is:

1. A plastics processing line, comprising
a transport system having a chain (4) for transporting a plastic layer through a thermoforming line, wherein the chain (4) comprises a holder for the plastic layer, so that the plastic layer can exert a transverse force on the chain (4) via the holder, transverse to a direction of chain progression with the thermoforming line in operation, and with a guide for the chain (4) to absorb the transverse force,
wherein the chain (4) comprises a basic structure with a plurality of rollers (12, 45) between brackets to absorb a transport direction force, wherein the rollers (12, 45) are oriented upright, so that the transverse force acts transverse to roller axes,
wherein the chain (4) is vertically supported on gravity support rollers that lie differently in position or in direction from the rollers (12, 45), and
wherein the rollers forming the chain themselves are different from the gravity support rollers that only support the chain in a perpendicular direction;
wherein a chain rail profile comprises a mirror symmetrical cross section with an uprightly oriented symmetry axis; and
wherein the chain rail profile comprises a cooling channel in the symmetry axis.

2. A plastics processing line, comprising
a transport system having a chain (4) for transporting a plastic layer through a thermoforming line, wherein the chain (4) comprises a holder for the plastic layer, so that the plastic layer can exert a transverse force on the chain (4) via the holder, transverse to a direction of chain progression with the thermoforming line in operation, and with a guide for the chain (4) to absorb the transverse force,
wherein the chain (4) comprises a basic structure with a plurality of rollers (12, 45) between brackets to absorb a force in a transport direction, wherein the guide acts directly on the rollers (12, 45),
and wherein the chain (4) is composed of outer brackets (9) and inner brackets (10) and with bolts (11) disposed between them, wherein each roller (12, 45) is disposed on a corresponding bolt (11), and wherein rollers (12, 45) are oriented upright, so that the transverse force acts transverse to roller axes of the rollers (12, 45),
wherein the respective bolt (11) does not sit vertically centered in the brackets, but rather is offset upward, so that a face (14) occurs downward, and
wherein the rollers forming the chain themselves are different from gravity support rollers that only support the chain in a perpendicular direction;
wherein a chain rail profile comprises a mirror symmetrical cross section with an uprightly oriented symmetry axis; and
wherein the chain rail profile comprises a cooling channel in the symmetry axis.

3. A plastics processing line, comprising
a transport system having a chain (4) for transporting a plastic layer through a thermoforming line, wherein the chain (4) comprises a plurality of holders for the plastic layer, so that the plastic layer can exert a transverse force on the chain (4) via the holders, transverse to a direction of chain progression with the thermoforming line in operation, and with a guide for the chain (4) to absorb the transverse force,
wherein the chain (4) comprises a basic structure with a plurality of rollers between brackets to absorb a force in a transport direction, wherein the chain (4) is composed of outer brackets (9) and inner brackets (10) and with bolts (11) disposed between the brackets,
wherein each roller (12) is disposed on a corresponding bolt (11) and wherein the rollers are oriented upright, so that the transverse force acts transverse to the roller axes,
wherein the plurality of holders are disposed on the bolts (11) in a form of attachment elements (47), positioned between the outer brackets (9), and
wherein the rollers forming the chain themselves are different from gravity support rollers that only support the chain in a perpendicular direction;
wherein a chain rail profile comprises a mirror symmetrical cross section with an uprightly oriented symmetry axis; and
wherein the chain rail profile comprises a cooling channel in the symmetry axis.

4. The plastics processing line according to claim 3, wherein the holders are also disposed between the inner brackets (10), positioned on the bolts (11).

5. The plastics processing line according to claim 1, wherein the chain (4) is structured to be free of transverse force support rollers.

6. A plastics processing line, comprising
a transport system having a chain (4) that runs in a chain rail profile (2, 31) for transporting a plastic layer through a thermoforming line, wherein the chain (4) comprises a holder for the plastic layer, so that the plastic layer can exert a transverse force on the chain (4) via the holder, transverse to a direction of chain progression with the thermoforming line in operation, and with a guide for the chain (4) to absorb the transverse force,
wherein the chain (4) comprises a basic structure with a plurality of rollers (12, 45) between brackets to absorb a force in a transport direction,
wherein in a vertical direction, the chain (4) is supported on a sliding surface (16) with outer brackets (9), wherein the chain rail profile (2, 31) is open toward a bottom and the sliding surface (16) is provided on a tab (15) that is attached to a lower side (18) of the chain rail profile (2, 31), and, together with the chain rail profile (2, 31), delimits a forward running space (5) and a return running space (6), and
wherein the rollers forming the chain themselves are different from gravity support rollers that only support the chain in a perpendicular direction;
wherein a chain rail profile comprises a mirror symmetrical cross section with an uprightly oriented symmetry axis; and
wherein the chain rail profile comprises a cooling channel in the symmetry axis.

7. The transport system with the chain (4), for use in a plastics processing line, according to claim 1.

8. A plastics processing line, comprising
a transport system having a chain (4) for transporting a plastic layer through a thermoforming line, wherein the chain (4) comprises a holder for the plastic layer, so that the plastic layer can exert a transverse force on the chain (4) via the holder, transverse to a direction of chain progression with the thermoforming line in operation, and with a guide for the chain (4) to absorb the transverse force, wherein the chain (4) comprises a basic structure with a plurality of rollers (12, 45) between brackets to absorb a transport direction force, wherein the rollers (12, 45) are oriented upright, so that the transverse force acts transverse to the roller axes, wherein the chain (4) is vertically supported on gravity support rollers that lie differently in position or in direction from the rollers (12, 45);

wherein the rollers forming the chain themselves are different from the gravity support rollers that only support the chain in a perpendicular direction;

wherein there is a vertical axis, which is the axis of a circular chain path as a whole through the transport system; wherein a chain rail profile comprises a mirror symmetrical cross section with an uprightly oriented symmetry axis; and wherein the chain rail comprises a cooling channel in the symmetry axis.

\* \* \* \* \*